United States Patent Office 3,284,344
Patented Nov. 8, 1966

3,284,344
HYDROCATALYTIC REFINING OF CHLORINE CONTAINING LUBRICATING OILS
Jacques Demeester and Raymond Helion, Paris, France, assignors to The British Petroleum Company Limited, London, England, a British joint-stock corporation
No Drawing. Filed Nov. 14, 1963, Ser. No. 323,611
Claims priority, application France, Nov. 16, 1962, 915,701
9 Claims. (Cl. 208—262)

This invention relates to the treatment of lubricating oils.

In the production of lubricating oils, it is necessary to give the oils a finishing treatment in order to give them a satisfactory colour and appearance and satisfactory heat and storage stability. The finishing treatment must not bring about any substantial change in the molecular structure of the oil, in particular there must be no appreciable drop in viscosity.

The finishing treatment that has been employed for many years consists in contacting the oil at high temperature with activated clay or percolating the oil through a fixed bed of granular clay. Both of these treatments have the disadvantage that they involve the handling of large quantities of solid matter while the disposal of spent clay is an additional disadvantage of the contact process. Some lubricants require acid treatment in addition to clay treatment and in this case the disposal of acid tar is a further embarrassment.

Catalytic reforming processes have made available large quantities of gases rich in hydrogen, thus rendering economically attractive methods of refining by means of hydrogen, and the use of a mild hydrogen treatment as an alternative to acid and/or clay treatment is being adopted on an increasing scale. The process is called hydrofinishing.

A catalyst commonly employed in the hydrofinishing process comprises the oxides of cobalt and molybdenum incorporated with an activated alumina support. This catalyst is capable of giving the desired colour but does not always give a sufficient stability and this difficulty is more apparent in the case of oils which have not been solvent refined and which usually need to be treated with sulphuric acid and clay. We have previously discovered that improved results with respect to the colour stability of the finished oils may be obtained by using a catalyst comprising the oxides of iron, cobalt and molybdenum incorporated with an activated alumina support.

Such catalysts have been found to be very effective in improving the colour stability of a wide variety of lubricating oils whether or not they have been solvent refined. It has been found, however, that certain lubricating oils cause the catalyst to be deactivated comparatively quickly and it is believed that this effect may be due to the fact that the oils have been prepared by methods involving the use of chlorinated solvents such as methylene chloride, small amounts of chlorinated solvent left in the oil being responsible for the deactivation of the catalyst.

Whatever may be the explanation of the deactivation, it has now been discovered that catalyst activity may be improved by arranging that the oil is contacted with the catalyst in the presence of a small amount of ammonia or amine.

According to the present invention therefore, a process for the treatment of a lubricating oil to produce an oil having improved colour stability comprises contacting the oil at elevated temperature and pressure in the presence of hydrogen and a small amount of ammonia or of an amine having from 1 to 4 carbon atoms with a catalyst comprising the oxides of cobalt, molybdenum and preferably also iron, the oxides being incorporated with a refractory oxide support, preferably alumina.

The amount of iron oxide in the catalyst (calculated as $Fe_2O_3$) may be from 4 to 20% by weight of total catalyst, and the amount of molybdenum oxide (calculated as $MoO_3$) may also be from 4 to 20% wt. The cobalt oxide may be present in an amount from 1 to 12% wt. (calculated as $CoO$). It is desirable to have a high content of iron oxide, particularly an amount in excess of the molybdenum oxide a particularly preferred range is 6–15% wt. The molybdenum oxide content is preferably from 5–12% wt., and a preferred range for the cobalt oxide is from 0.5 to 4% wt. The ratio by weight of molybdenum oxide to cobalt oxide should be at least 1.5:1 and is preferably at least 3:1.

The catalyst is preferably prepared by impregnating alumina with solutions of the metal compounds followed by drying and calcination. In order to produce catalysts containing a high iron content, it is desirable to impregnate first with a solution of an iron compound followed by drying and calcination. Impregnation with a solution of a molybdenum compound then follows. The impregnation with a solution of cobalt is carried out last, with preferably another calcination between this impregnation and the previous impregnation with molybdenum. Further information on suitable catalysts and their methods of preparation is contained in French Patent Nos. 1,195,544, 1,244,312 and 1,270,706.

When treating lubricating oils containing an appreciable quantity of sulphur, it is desirable to operate at sufficiently low temperatures to avoid an undue reduction in the viscosity of the oil. Temperatures in the range 150 to 340° C. have been found to be suitable for such sulphur-containing oils, preferably 250–320° C.

The pressure may vary between 5 ats. and 80 ats. but in practice one will use a pressure corresponding to the pressure of the hydrogen-rich gases from catalytic reforming processes which may be at 20–30 ats. The hydrogen feed-rate is also variable but low, being from 5–150 volumes per volume of oil under normal conditions. A preferred value is in the region of 23 vols. per vol. of oil. The feedrate can vary from 0.5 to 6 vols. of oil per vol. of catalyst per hour, the higher values being suitable for solvent-refined oils.

The preferred nitrogen compound to be added is ammonia. If amines are used they are preferably alkanolamines, particularly ethanolamine.

The amount of ammonia or amine added is desirably less than 1% wt. by weight of oil treated, more particularly from 0.01 to 0.75% wt. The ammonia or amine may be added directly into the reactor or added to the oil or hydrogen passing to the reactor. It is particularly conveniently added to the hydrogen.

Ammonia is preferred because it decreases the rate of catalyst deactivation appreciably even when a chlorine-containing feed is being processed. Ammonia also restores the activity of a deactivated catalyst if it is added to a non-chlorine containing feed passing over the deactivated catalyst. Amines are relatively less effective than ammonia in preventing catalyst deactivation when used in combination with a chlorine-containing feed, but may be useful in restoring catalyst activity when passed with a non-chlorine containing feed over a deactivated catalyst.

Chlorine is believed to deactivate the catalyst by accumulation on the catalyst surface so that the poisoning effect is a function of both the chlorine content of the feedstock and the length of time the feedstock is passed over the catalyst. The maximum quantity that can be tolerated for any given situation can readily be determined by experiment.

Since it is probable that ammonia reacts with the chlorine to form ammonium chloride, the usual precautions taken when operating in the presence of this material are advisable.

The invention will now be described with reference to the following examples:

*Example 1*

The catalyst employed had the following composition by weight:

|  | Percent |
|---|---|
| $MoO_3$ | 10.5 |
| $CoO$ | 3 |
| $Fe_2O_3$ | 14 |
| $Al_2O_3$ | Balance | and was activated by contact for 72 hours with a Kuwait spindle oil under the following conditions:

| Temperature | 350° C. |
|---|---|
| Pressure | 20 kg./cm.$^2$. |
| Space velocity of the oil | 1 v./v./hr. |
| Hydrogen flow rate | 20 vols. per vol. of oil. |

The oil treated was a Kuwait spindle oil and the processing conditions were the same as those used for activating the catalyst except that the temperature was 275° C.

The colour of the hydrogenated samples was determined by means of a photocolorimeter and expressed by interpolation on the scale of ASTM Method D.1500.

The colour stability is measured by the difference between the colours obtained by the preceding method for a fresh oil and an oil aged for 16 hours at 85° C.

The oil was treated alone with the addition of 0.01% wt. of chlorine in the form of methylene chloride, $CH_2Cl_2$, and 0.2% ethanolamine. The results obtained are set out in the following table.

of the Kuwait spindle oil the catalyst activity had dropped to a product colour of 0.95 and a colour stability of 1.60. This drop in activity was due to the fact that, at various periods up to 1096 hours on stream, the spindle oil feedstock contained 35 p.p.m. of chlorine as methylene chloride.

During the period of 1096 to 1320 hours on stream a chlorine free feedstock was used, but the catalyst activity remained poor.

At 1320 hours on stream 0.03 grams of ammonia/litre of hydrogen (i.e. 0.6 gm. of ammonia/litre of oil) and 0.01 gram of water/litre of hydrogen (0.2 gm. of water/litre of oil) were added to the hydrogen passing to the reaction zone. The spindle oil feedstock remained free of chlorine. The catalyst activity improved rapidly, the colour stability in particular improving to 0.25 by 1440 hours on stream.

At 1440 hours on stream 35 p.p.m. of chlorine were added to the feedstock, and this chlorine containing feedstocks was used for the remainder of the experiment which lasted until 3102 hours on stream. The addition of the ammonia and water was also contained throughout this period, and despite the presence of chlorine the catalyst maintained a good activity. At 3102 hours on stream the colour stability of the product was still no higher than 0.45 and the catalyst was by no means completely deactivated.

It is noted that both water and ammonia were present during the experiment. However, a previous experiment had shown that water alone, while beneficial to a certain extent, was not capable of giving the same degree of improvement as was found in the present experiment. A major amount of the improvement must, therefore, have been due to the ammonia.

|  | Oil without chlorine | | Oil with the addition of 0.01% wt. chlorine | | Oil with the addition of 0.11% wt. chlorine and 0.2% wt. ethanolamine | |
|---|---|---|---|---|---|---|
|  | Colour | Stability | Colour | Stability | Colour | Stability |
| At beginning of experiment | 0.9 | 0.3 | 0.9 | 0.3 | 0.9 | 0.3 |
| After 50 hours |  |  | 0.95 | 0.55 | 0.9 | 0.3 |
| After 100 hours |  |  | 1.0 | 0.60 | 0.9 | 0.4 |
| After 200 hours |  |  | 1.05 | 0.70 | 0.95 | 0.45 |
| After 300 hours |  |  | 1.1 | 0.85 | 0.95 | 0.45 |
| After 400 hours | 0.9 | 0.3 | 1.2 | 1.40 | 1.0 | 0.45 |
| After 500 hours |  |  | 2.5 |  | 1.15 | 0.45 |
| After 600 hours |  |  |  |  | 1.2 | 0.40 |
| After 700 hours | 0.9 | 0.3 |  |  | 1.2 | 0.60 |

It will be seen from the table that the addition of 0.01% wt. of chlorine to the feedstock decreased the catalyst activity rapidly as shown by the substantial increase in the figures for colour and colour stability. The presence of 0.2% wt. of ethanolamine was, however, beneficial in reducing the adverse effect of the chlorine.

*Example 2*

The catalyst employed had the following composition by weight

|  | Percent |
|---|---|
| $MoO_3$ | 8.9 |
| $CoO$ | 2.4 |
| $Fe_2O_3$ | 14.4 |

It was activated in the same way as the catalyst of Example 1 and used for treating a Kuwait spindle oil. The processing conditions were also the same as for Example 1.

The initial activity of the fresh catalyst was such as to give a product with a colour of 0.7 and a colour stability of 0.35. However, after 1096 hours of processing

We claim:

1. A process for the catalytic treatment of a lubricating oil containing minor amounts of chlorine containing material therein, which tends to deactivate the catalyst, so as to prevent catalyst deactivation thereby and to produce an oil having improved color stability without a material change in the viscosity thereof, said process comprising contacting the lubricating oil with a catalyst comprising the oxides of cobalt and molybdenum on a refractory oxide support at a temperature of from 150–340° C. at a pressure of from 5–80 atmospheres, in the presence of hydrogen, and in the presence of from 0.01 to about 0.75% by weight of oil treated of an added chlorine suppressing compound selected from the group consisting of ammonia and an amine having from 1–4 carbon atoms, said chlorine suppressing compound being added in the above amounts from the beginning of the treatment.

2. A process as claimed in claim 1 wherein the catalyst contains also iron oxide.

3. A process as claimed in claim 2, wherein the catalyst contains from 4 to 20% wt. of iron oxide, from 4 to 20% wt. of molybdenum oxide and 1 to 12% wt. of cobalt oxide.

4. A process as claimed in claim 3 wherein the iron oxide content exceeds the molybdenum oxide content and the ranges are

| | Percent wt. |
|---|---|
| Iron oxide | 6 to 15 |
| Molybdenum oxide | 5 to 12 |
| Cobalt oxide | 0.5 to 4 |

5. A process as claimed in claim 1 wherein the support is alumina.

6. A process as claimed in claim 1 wherein the temperature is from 250 to 320° C.

7. A process as claimed in claim 1 wherein the pressure is from 20 to 30 ats.

8. A process as claimed in claim 1 wherein the oil space velocity is from 0.5 to 6 volumes of oil/vol. of catalyst/hour and the hydrogen feedrate from 5 to 150 volumes/vol. of oil.

9. A process for the catalytic treatment of a lubricating oil containing minor amounts of chlorine containing material therein, which tends to deactivate the catalyst, so as to prevent catalyst deactivation thereby and to produce an oil having improved color stability without a material change in the voscosity thereof, said process comprising contacting the lubricating oil with a catalyst comprising the oxides of cobalt and molybdenum at a temperature of from 150–340° C. at a pressure of from 5–80 atmospheres, in the presence of hydrogen, and in the presence of less than 1% by weight of oil treated of an added amine having from 1 to 4 carbon atoms as a chlorine suppressing material.

References Cited by the Examiner
UNITED STATES PATENTS

| 3,020,228 | 2/1962 | Demeester | 208—264 |
| 3,105,813 | 10/1963 | Gutberlet | 208—254 |
| 3,189,540 | 6/1965 | Kozlowski et al. | 208—264 |

DELBERT E. GANTZ, *Primary Examiner.*

S. P. JONES, *Assistant Examiner.*